United States Patent
Huang

(10) Patent No.: US 9,928,494 B2
(45) Date of Patent: Mar. 27, 2018

(54) VERIFYING A STATUS OF A USER DEVICE USED FOR SETTLING A TRANSACTION WITH A POINT OF SALE TERMINAL

(71) Applicant: Verizon Patent and Licensing Inc., Basking Ridge, NJ (US)

(72) Inventor: Chien-Yuan Huang, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 481 days.

(21) Appl. No.: 14/274,936

(22) Filed: May 12, 2014

(65) Prior Publication Data

US 2015/0324880 A1 Nov. 12, 2015

(51) Int. Cl.
 *G06Q 30/00* (2012.01)
 *G06Q 20/20* (2012.01)
 *G06Q 30/06* (2012.01)
 *G06Q 20/32* (2012.01)
 *G06Q 20/02* (2012.01)

(52) U.S. Cl.
 CPC ........... *G06Q 20/202* (2013.01); *G06Q 20/02* (2013.01); *G06Q 20/204* (2013.01); *G06Q 20/3221* (2013.01); *G06Q 20/3227* (2013.01); *G06Q 20/3278* (2013.01); *G06Q 30/06* (2013.01); *G06Q 30/0609* (2013.01)

(58) Field of Classification Search
 USPC .................................................... 705/26, 27
 See application file for complete search history.

(56) References Cited

U.S. PATENT DOCUMENTS

| | | | | |
|---|---|---|---|---|
| 6,550,671 B1* | 4/2003 | Brown | ............... | G07D 11/0066 235/379 |
| 9,286,604 B2* | 3/2016 | Aabye | ..................... | G06Q 20/32 |
| 2002/0180586 A1* | 12/2002 | Kitson | ..................... | G06F 21/32 340/5.82 |
| 2009/0253406 A1* | 10/2009 | Fitzgerald | ............... | G06F 21/88 455/410 |
| 2010/0005509 A1* | 1/2010 | Peckover | ................ | G06F 21/10 726/3 |

(Continued)

OTHER PUBLICATIONS

NewsRX: Apple Inc.; Patent Application Titled "Systems and Methods for Identifying Unauthorized Users of an Electronic Device," Politics & Government, Apr. 17, 2014; ProQuest Dialog #1514341113, 5pgs.*

(Continued)

*Primary Examiner* — Robert M Pond

(57) ABSTRACT

One or more devices are configured to receive a request, from a point of sale terminal, to verify a status of a user device being used to settle a transaction with the point of sale terminal. The status may indicate whether the user device has been reported stolen to an operator network. The one or more device may receive a user device identifier, from the point of sale terminal, that identifies the user device. The one or more devices may determine the status of the user device based on the user device identifier. The one or more devices may generate a response indicating the status of the user device. The one or more devices may send the response indicating the status of the user device to the point of sale terminal to permit the point of sale terminal to selectively settle the transaction.

20 Claims, 9 Drawing Sheets

(56) References Cited

U.S. PATENT DOCUMENTS

| | | | |
|---|---|---|---|
| 2010/0198728 A1* | 8/2010 | Aabye | G06Q 20/40 |
| | | | 705/44 |
| 2012/0158540 A1* | 6/2012 | Ganti | G06Q 30/0609 |
| | | | 705/26.35 |
| 2014/0156545 A1* | 6/2014 | Clapham | G06Q 10/00 |
| | | | 705/311 |

OTHER PUBLICATIONS

"Philippines: Kaspersky Lab Launches Kaspersky Mobile Security 9.0 and KasperskyTablet Security," Asia News Monitor, Aug. 1, 2013; Proquest Dialog #1415791099 4pgs.*
Wikipedia, "Point of sale", http://en.wikipedia.org/wiki/Point_of_sale, Apr. 30, 2014, 7 pages.
Wikipedia, "System Architecture Evolution", http://en.wikipedia.org/wiki/System_Architecture_Evolution, Apr. 2, 2014, 8 pages.

* cited by examiner

VERIFYING A STATUS OF A USER DEVICE USED FOR SETTLING A TRANSACTION WITH A POINT OF SALE TERMINAL

BACKGROUND

A person may use a point of sale (POS) terminal to complete a retail transaction at a store. For example, a person may swipe a credit card at the POS terminal to pay for goods or services. Smart phones or other user devices may also be used to communicate with a POS terminal to pay for goods or services.

DETAILED DESCRIPTION OF PREFERRED EMBODIMENTS

The following detailed description of example implementations refers to the accompanying drawings. The same reference numbers in different drawings may identify the same or similar elements.

When a user device is used to settle a transaction at a POS terminal, there is a risk that the user of the user device may have stolen the user device and is not an authorized user of the user device. For example, the user (e.g., a thief) may try to use payment information (e.g., a credit card number, a virtual wallet, etc.) stored on the user device, and that belongs to the true owner of the user device, to settle transactions at POS terminals.

While the true owner of the user device may have reported the user device stolen to an operator network to which the user device connects, the true owner may have forgotten or not have known to notify financial institutions (e.g., a credit card company, a bank, etc.) related to payment information stored on the user device that the payment information may have been stolen or compromised.

Thus, a POS terminal merely verifying, with a financial institution, that payment information received from a user device is sufficient to settle the transaction may not prevent a thief from using the stolen user device to settle a transaction at the POS terminal. For example, the financial institution may not know that the payment information has been stolen and that the payment should not be authorized.

Implementations described herein may verify a status of a user device, used to settle a transaction at a POS terminal, with an operator network before settling the transaction with the POS terminal. Accordingly, transactions between POS terminals and stolen user devices may be prevented even though payment information, stored on the stolen user devices, may not have been flagged as stolen. Moreover, implementations described herein may provide security measures to prevent future use of the stolen user device based on an attempt to use the stolen user device at a POS terminal.

Figure 1:
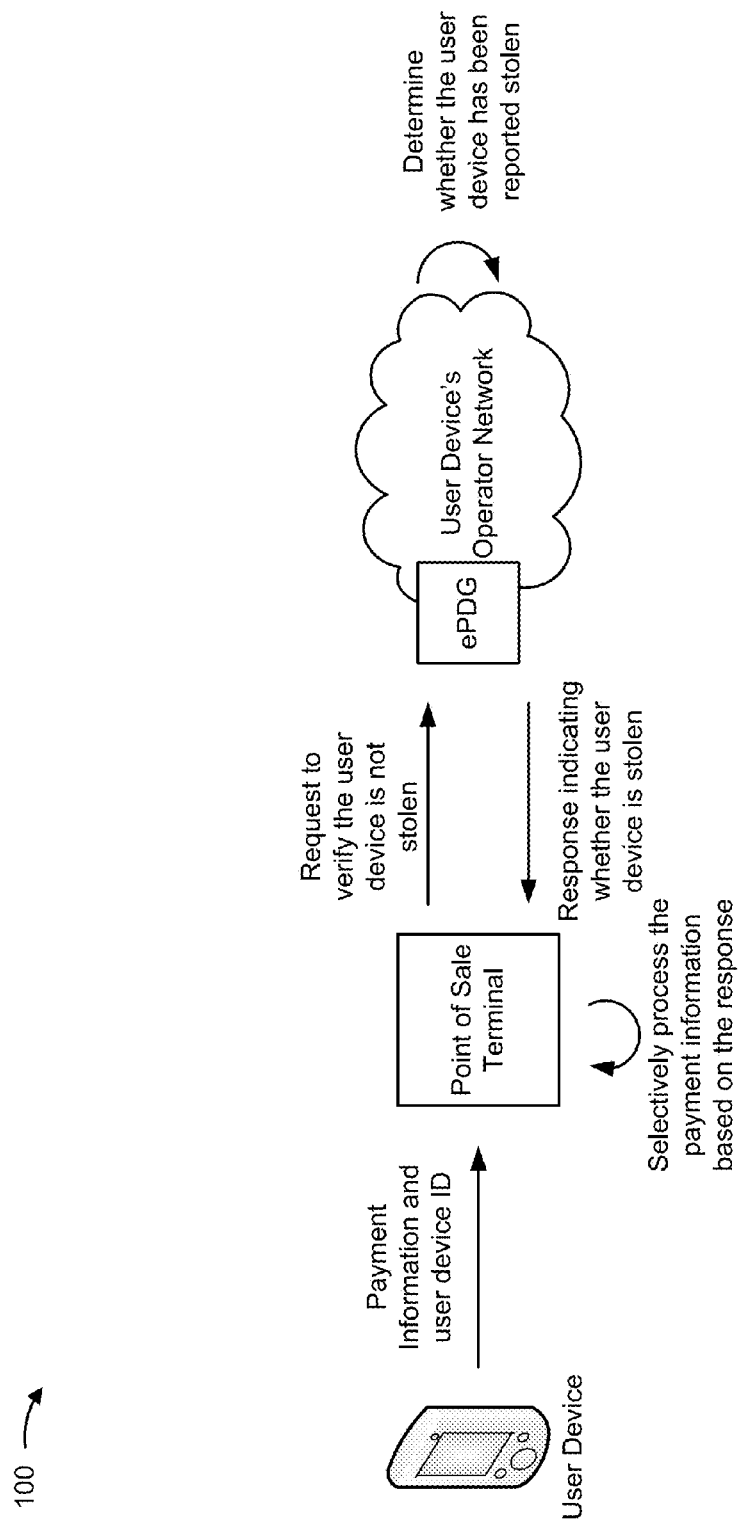
FIG. 1 is a diagram of an overview of an example implementation described herein.

FIG. 1 is a diagram of an overview of an example implementation 100 described herein. In example implementation 100, assume a user is attempting to use a user device to settle a transaction (e.g., a retail transaction) with a POS terminal at a store. As shown in FIG. 1, the user device may send payment information for settling the transaction and a user device identifier (ID) that identifies the user device to the POS terminal.

The POS terminal may receive the payment information and the user device ID. The POS terminal may generate a request to verify whether the user device is not stolen. The request may indicate the user device ID. The POS terminal may send the request to an operator network associated with the user device. For example, the POS terminal may send the request to the operator network via an evolved packet data gateway (ePDG). Using an ePDG may avoid an air interface charge and may be used in areas that are not covered by an air interface while still providing a secure connection to the operator network.

The operator network may receive the request. The operator network may search an equipment information register (EIR) device, that stores information on stolen user devices, using the user device ID. The operator network may determine whether the user device is stolen based on whether the EIR indicates a user device associated with the user device ID has been reported stolen. The operator network may generate a response indicating whether the user device is stolen and send the response to the POS terminal.

The POS terminal may receive the response and selectively process the payment information based on the response. For example, if the response indicates that the user device is not stolen, the POS terminal may settle the transaction based on the payment information. For instance, the payment information may include a credit card number and the POS terminal may contact a credit card server to verify sufficient funds are associated with the credit card number to settle the transaction. On the other hand, if the response indicates that the user device is stolen, the POS terminal may not process the payment information to settle the transaction.

Additionally, or alternatively, if the response indicates that the user device is stolen, the POS terminal and/or the operator network may implement security measures to prevent the user device from being used in the future and/or to apprehend the user of the user device. For example, the POS terminal and/or the operator network may send a command to the user device to lock the user device, to activate a GPS device included in the user device, to capture an image of the user and send the image to a law enforcement agency (e.g., the police), etc.

In this way, a stolen user device may be prevented from being used to settle a transaction with a POS terminal independent of whether the payment information stored on the user device has been flagged as stolen.

Figure 2:
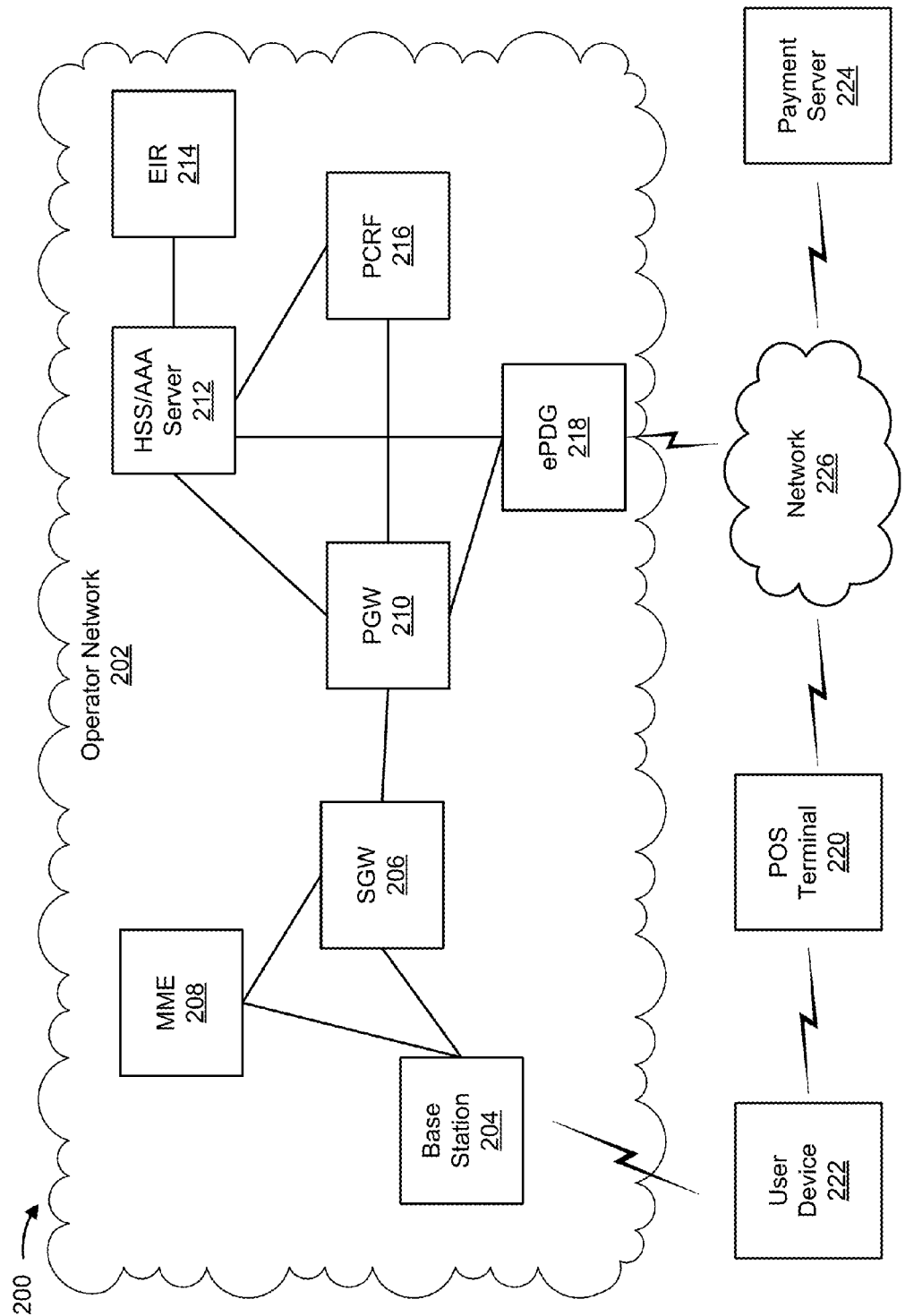
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an operator network 202. Operator network 202 may include a base station 204, a serving gateway 206 (hereinafter referred to as "SGW 206"), a mobility management entity device 208 (hereinafter referred to as "MME 208"), a packet data network (PDN) gateway 210 (hereinafter referred to as "PGW 210"), a home subscriber server/authentication, authorization, accounting server 212 (hereinafter referred to as "HSS/AAA server 212"), an equipment information register storage device ("hereinafter referred to as "EIR 214"), a policy and charging rules function server 216 (hereinafter referred to as "PCRF server 216"), and/or an evolved packet data gateway 218 (hereinafter referred to as "ePDG 218"). Environment 200 may also include a point of sale terminal 220 (hereinafter referred to as "POS terminal 220"), a user device 222, a payment server 224, and/or a network 226. Devices of environment 200 may interconnect via wired connections, wireless connections, or a combination of wired and wireless connections.

Operator network 202 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations 204, such as eNodeBs (eNBs), via which user device 222 communicates with the EPC. The EPC may include SGW 206, MME 208, and/or PGW 210 that enables user device 222 to communicate with network 226, HSS/AAA server 212, and/or PCRF server 216 and may manage certain information and services, such as authentication, session initiation, account information, and/or a user profile, associated with user device 222. The LTE network may include multiple base stations 204, and the EPC may include multiple SGWs 206, MMEs 208, and/or PGWs 210. Additionally, or alternatively, operator network 202 may include a cellular network, a public land mobile network (PLMN), a second generation (2G) network, a third generation (3G) network, a fourth generation (4G) network, a fifth generation (5G) network, and/or another network.

Base station 204 may include one or more network devices that receive, process, and/or transmit traffic, such as audio, video, text, and/or other data, destined for and/or received from user device 222. In an example implementation, base station 204 may be an eNB device and may be part of the LTE network. Base station 204 may receive traffic from and/or send traffic to network 226 via SGW 206 and PGW 210. Base station 204 may send traffic to and/or receive traffic from user device 222 via an air interface. One or more of base stations 204 may be associated with a RAN, such as the LTE network.

SGW 206 may include one or more network devices, or other types of computation or communication devices, that gather, process, search, store, and/or provide information in a manner described herein. SGW 206 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 206 may, for example, aggregate traffic received from one or more base stations 204 and may send the aggregated traffic to network 226 via PGW 210. In one example implementation, SGW 206 may route and forward data, may act as a mobility anchor for a user plane during inter-base station handovers, and may act as an anchor for mobility between LTE and other 3GPP technologies.

MME 208 may include one or more computation or communication devices that gather, process, search, store, and/or provide information in a manner described herein. For example, MME 208 may perform operations associated with a handoff to and/or from the EPS. MME 208 may perform operations to register user device 222 with the EPS, to handoff user device 222 from the EPS to another network, to handoff user device 222 from the other network to the EPS, and/or to perform other operations. MME 208 may perform policing operations for traffic destined for and/or received from user device 222.

PGW 210 may include one or more network devices that gather, process, search, store, and/or provide information in a manner described herein. PGW 210 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 210 may, for example, provide connectivity of user device 222 to external packet data networks, such as network 226, by being a traffic exit/entry point for user device 222 and/or via interaction with ePDG 218. PGW 210 may perform policy enforcement, packet filtering, charging support, lawful intercept, and packet screening. PGW 210 may also act as an anchor for mobility between 3GPP and non-3GPP technologies. PGW 210 may authenticate user device 222 (e.g., via interaction with HSS/AAA server 212).

HSS/AAA server 212 may include one or more server devices, or other types of computation or communication devices, that gather, process, search, store, and/or provide information in a manner described herein. For example, HSS/AAA server 212 may manage, update, and/or store, in a memory associated with HSS/AAA server 212, profile information associated with user device 222 that identifies applications and/or services that are permitted for and/or accessible by user device 222, bandwidth or data rate thresholds associated with the applications or services, information associated with a user of user device 222 (e.g., a username, a password, a personal identification number (PIN), etc.), a data plan, rate information, minutes allowed, and/or other information. Additionally, or alternatively, HSS/AAA server 212 may include a device that performs authentication, authorization, and/or accounting (AAA) operations associated with a communication session with user device 222. With regard to the authentication operation, HSS/AAA server 212 may verify a device's (e.g., user device 222) specific digital identity provided via an identifier (e.g., a password, a digital certificate, a phone number, etc.) associated with the device. With regard to the authorization function, HSS/AAA server 212 may grant or refuse privileges to a device (e.g., user device 222) for accessing specific services (e.g., IP address filtering, address assignment, route assignment, quality of service (QoS), etc.). With regard to the accounting operation, HSS/AAA server 212 may track consumption of network resources (e.g., by user device 222) and may use this information for management, planning, billing, etc.

EIR 214 may include one or more server devices, or other types of computation or communication devices, that gather, process, store, and/or provide information in a manner described herein. EIR 214 may store information regarding a current status of devices registered with operator network 202 (e.g., user device 222). For example, EIR 214 may store a data structure indicating whether a device (e.g., user device 222) has been reported stolen. HSS/AAA server 212 may search the information stored by EIR 214 and obtain information from EIR 214.

PCRF server 216 may include a policy and charging rules function that may perform operations that enforce EPS policies associated with a communication session with user device 222. For example, the PCRF may dynamically provide real-time bandwidth allocations and/or controls (e.g., associated with a particular access point name (APN)) associated with particular applications, network accesses, and/or services provided to user device 222 during a communication session. The PCRF may also dynamically provide a real-time signal flow policy to adapt to changing conditions within the network and/or to manage traffic flow during the communication session.

ePDG 218 may include one or more network devices that gather, process, search, store, and/or provide information in a manner described herein. ePDG 218 may include one or more data processing and/or traffic transfer devices, such as a gateway, a router, a modem, a switch, a firewall, a NIC, a hub, a bridge, a proxy server, or some other type of device that processes and/or transfers traffic. ePDG 218 may provide secure data transmission from a client device (e.g., POS terminal 220) to the EPC over a non-3GPP wireless communication standard.

POS terminal 220 may include a device capable of receiving, processing, and providing information. POS terminal 220 may receive payment from user device 222 and/or payment server 224 for a transaction. In some implementations, POS terminal 220 may be located at retail stores to receive payment from user device 222 for a retail transaction. Additionally, or alternatively, POS terminal 220 may be used to provide money to a user and/or provide financial information related to accounts held by a user (e.g., a bank account). For example, POS terminal 220 may be an automated teller machine (ATM). In some implementations, POS terminal 220 may include a communication interface that allows POS terminal 220 to receive information from and/or transmit information to another device in environment 200. For example, POS terminal 220 may be capable of communicating with user device 222 using Near-Field Communication (NFC), Bluetooth, WiFi, or another radio frequency communication.

User device 222 may include a device capable of receiving, processing, and providing information. For example, user device 222 may include a mobile phone (e.g., a smart phone, a radiotelephone, etc.), a computing device (e.g., a laptop computer, a tablet computer, a handheld computer, a gaming device, etc.), or a similar device. In some implementations, user device 222 may include a communication interface that allows user device 222 to receive information from and/or transmit information to another device in environment 200. For example, user device 222 may be capable of communicating using NFC, Bluetooth, WiFi, or another radio frequency communication.

Payment server 224 may include one or more devices, such as one or more server devices, capable of storing, processing, and/or routing information. In some implementations, payment server 224 may include a communication interface that allows payment server 224 to receive information from and/or transmit information to other devices in environment 200.

Network 226 may include one or more wired and/or wireless networks. For example, network 226 may include a cellular network, a PLMN, a 2G network, a 3G network, a 4G network, a 5G network, a LTE network, and/or a similar type of network. Additionally, or alternatively, network 226 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, HSS/AAA server 212 and EIR 214 may be implemented within a single device. Additionally, or alternatively, a set of devices (e.g., one or more devices) of environment 200 may perform one or more functions described as being performed by another set of devices of environment 200.

Figure 3:
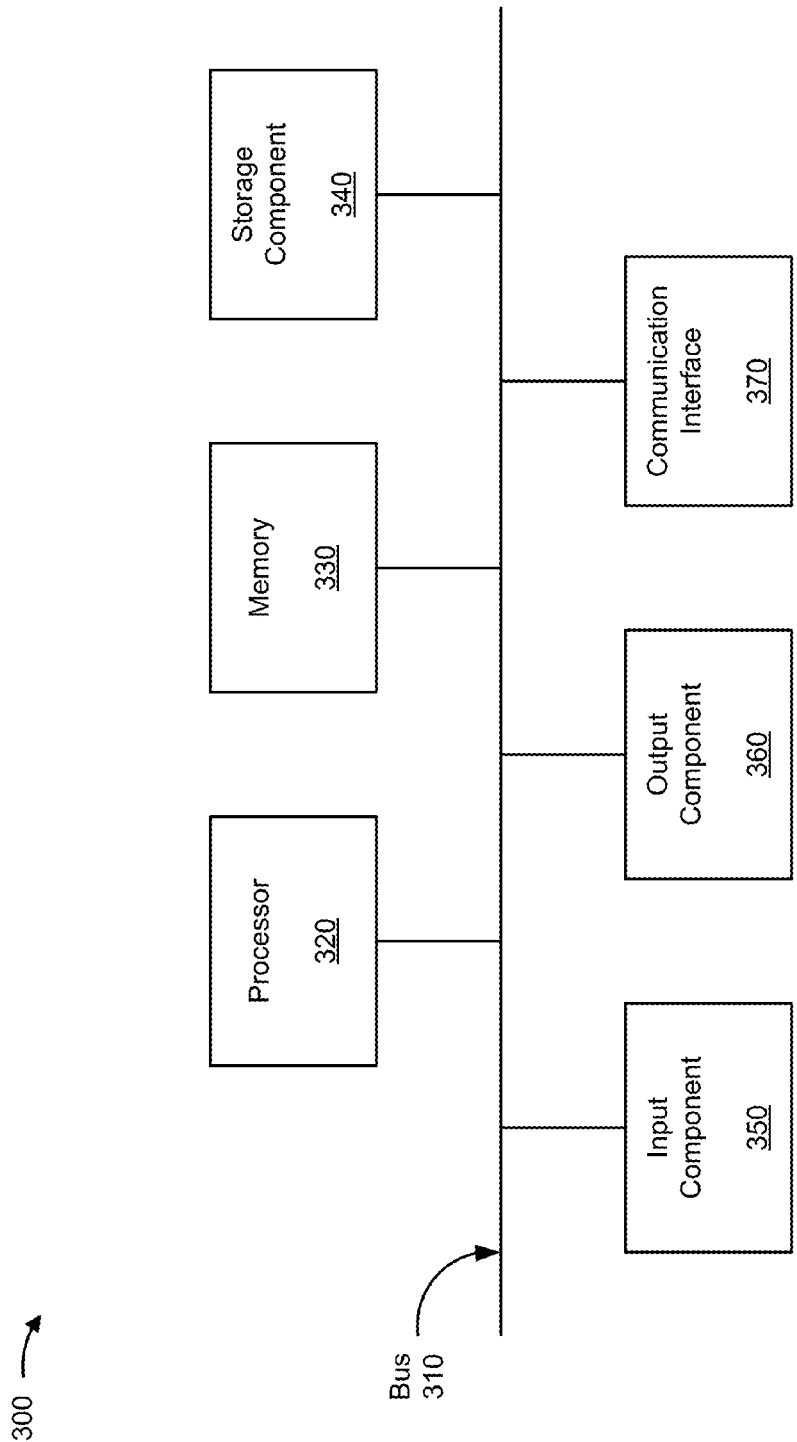
FIG. 3 is a diagram of example components of one or more devices of FIG. 2.

FIG. 3 is a diagram of example components of a device 300. Device 300 may correspond to base station 204, SGW 206, MME 208, PGW 210, HSS/AAA server 212, EIR 214, PCRF server 216, ePDG 218, POS terminal 220, user device 222, and/or payment server 224. In some implementations, base station 204, SGW 206, MME 208, PGW 210, HSS/AAA server 212, EIR 214, PCRF server 216, ePDG 218, POS terminal 220, user device 222, and/or payment server 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
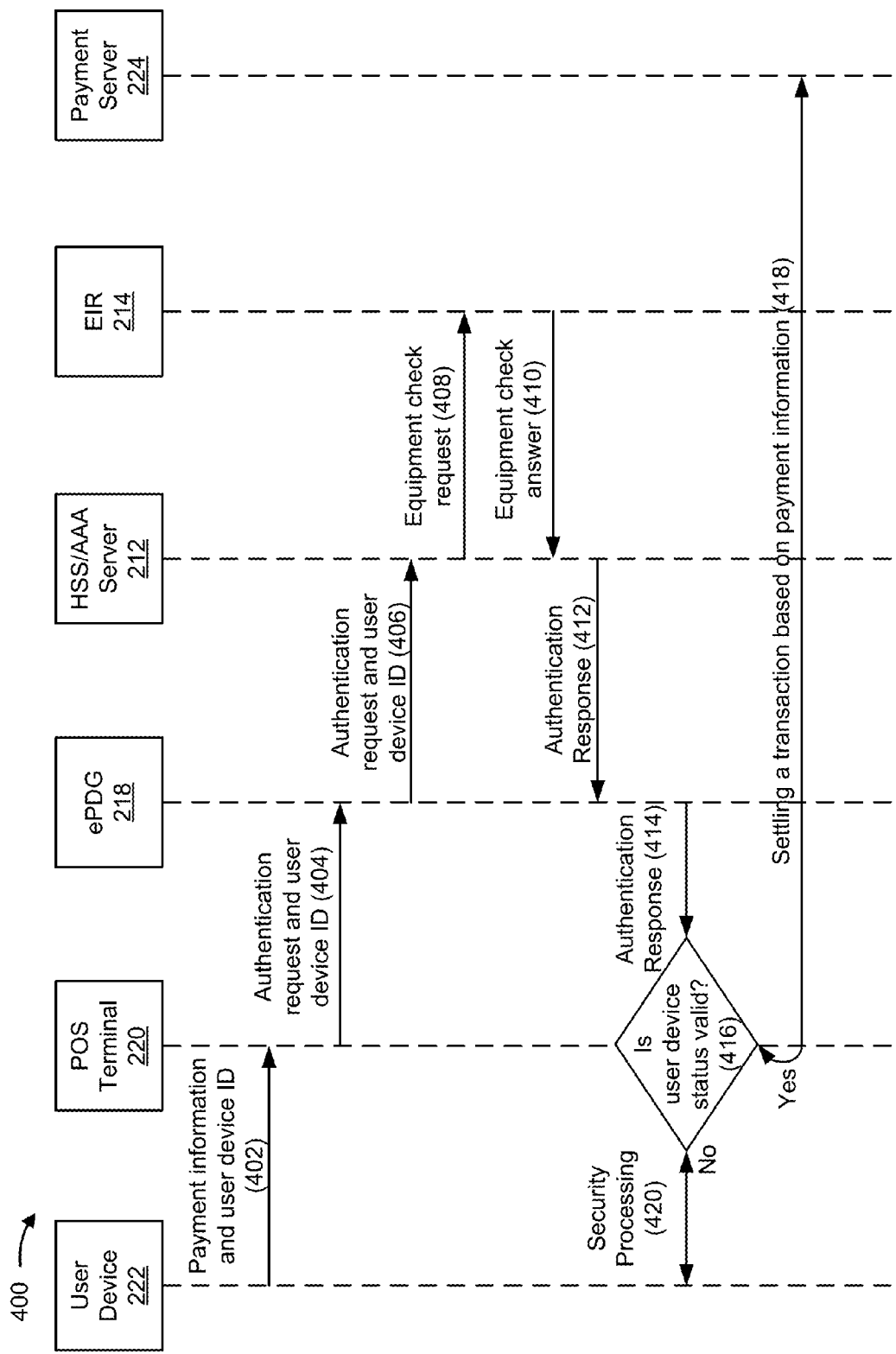
FIG. 4 is a call flow diagram of an example process for authenticating a POS transaction.

FIG. 4 is a call flow diagram of an example process 400 for authenticating a POS transaction. In some implementations, one or more process blocks of FIG. 4 may be performed by HSS/AAA server 212, EIR 214, ePDG 218, POS terminal 220, user device 222, and/or payment server 224. In some implementations, one or more process blocks of FIG. 4 may be performed by another device or a group of devices separate from or including HSS/AAA server 212, EIR 214, ePDG 218, POS terminal 220, user device 222, and/or payment server 224, such as base station 204, SGW 206, MME 208, PGW 210, and/or PCRF server 216.

As shown in FIG. 4, process 400 may include sending payment information and a user device ID to POS terminal 220 (block 402). For example, user device 222 may send the payment information and the user device ID to POS terminal 220.

A user may use user device 222 to settle a retail transaction or another kind of transaction with POS terminal 220. User device 222 and POS terminal 220 may establish a connection using a kind of RF communication (e.g., NFC) or another wireless or wired communication method. After the connection is established, user device 222 and POS terminal 220 may exchange information about the transaction (e.g., a sales price, store information, etc.).

Additionally, or alternatively, user device 222 may send a user device ID and payment information to POS terminal 220.

The user device ID may uniquely identify user device 222. For example, the user device ID may include a phone number, an IP address, an international mobile subscriber identity ("IMSI"), an international mobile station equipment identify ("IMEI"), a mobile equipment identifier ("MEID"), or the like. In some implementations, user device 222 may send operator network information identifying an operator network 202 to which user device 222 connects. For example, the operator network information may include a unique identifier of an operator of operator network 202 with which user device 222 is registered.

The payment information may include information used to settle the transaction. For example, the payment information may include a credit card number, a bank account number, or another account number used to identify an account the user may use to settle the transaction. The payment information may be used by the POS terminal 220 to settle the transaction with a third party (e.g., a credit card company, a bank, etc.) via payment server 224. Additionally, or alternatively, the payment information may include virtual currency that user device 222 sends to POS terminal 220. For example, user device 222 may store a virtual wallet in a memory included in or available to user device 222. User device 222 may deduct virtual currency from the virtual wallet and transfer the deducted virtual currency to POS terminal 220 to settle the transaction.

POS terminal 220 may receive the user device ID, the operator network information, and/or the payment information sent by user device 222.

As further shown in FIG. 4, process 400 may include sending an authentication request and the user device ID to ePDG 218 (block 404). For example, POS terminal 220 may send the authentication request and the user device ID to ePDG 218.

POS terminal 220 may generate an authentication request based on establishing the connection with user device 222 and/or receiving the user device ID from user device 222. The authentication request may request that operator network 202 verify the status of user device 222. A status may include a valid status indicating that user device 222 is permitted to participate in transactions with POS terminals 220 (e.g., indicating that user device 222 has not been reported stolen and/or that user device 222 is not banned from using operator network 202). On the other hand, a status may include an invalid status indicating that user device 222 is not permitted to participate in transactions with POS terminals 220 (e.g., indicating that the user device 222 has been reported stolen and/or that user device 222 is banned from using operator network 202).

In some implementations, POS terminal 220 may determine an ePDG 218 with which to establish a connection based on the operator network information. Different operator networks 202 may have different ePDGs 218 that POS terminal 220 may use to communicate with the respective operator networks 202. Each operator network 202 may only be able to verify a status of a user device 222 registered with that operator network 202. Accordingly, POS terminal 220 may determine with which operator network 202 to communicate to verify the status of the user device 222 based on the operator network information received from user device 222. POS terminal 220 may establish a connection with an ePDG 218 included in the determined operator network 202.

POS terminal 220 and ePDG 218 may set up a secure IP tunnel, via network 226, to exchange data using an Internet Key Exchange (IKE) protocol. For example, POS terminal 220 may send an Internet Key Exchange version 2 (IKEv2) security association (SA) request to ePDG 218. POS terminal 220 may receive the IKEv2 SA request and send an IKEv2 SA response to POS terminal 220. POS terminal 220 may receive the IKEv2 SA response, thereby establishing the secure IP tunnel and exchanging a shared encryption key. POS terminal 220 may encrypt an authentication request and/or the user device ID using the shared encryption key and the send the encrypted authentication request and/or the encrypted user device ID to ePDG 218 via the secure IP tunnel.

ePDG 218 may receive the encrypted authentication request and/or the encrypted user device ID sent by POS terminal 220. ePDG 218 may decrypt the encrypted authentication request and the encrypted user device ID using the shared encryption key (or an associated decryption key). Accordingly, POS terminal 220 may communicate with ePDG 218 through network 226 and independent of an air interface with base station 204.

As further shown in FIG. 4, process 400 may include sending the authentication request and the user device ID to HSS/AAA server 212 (block 406). For example, ePDG 218 may send the authentication request and the user device ID to HSS/AAA server 212 using an authentication, authorization, and accounting protocol (e.g., Diameter protocol, Radius protocol, etc.). For example, ePDG 218 may send a Diameter Extensible Authentication Protocol (EAP) request including the authentication request and the user device ID to HSS/AAA server 212.

HSS/AAA server 212 may receive the Diameter EAP request including the authentication request and the user device ID sent from ePDG 218.

As further shown in FIG. 4, process 400 may include sending an equipment check request to EIR 214 (block 408). For example, HSS/AAA server 212 may send the equipment check request to EIR 214 to check the status of user device 222.

EIR 214 may store information indicating whether user device 222 has been reported stolen by an owner of user device 222 and/or another party. For example, EIR 214 may store information associating a status of a user device 222 with a user device ID for user device 222. A valid status may indicate that user device 222 is permitted to operate on operator network 202 and be used to settle transactions with POS terminals 220. An invalid status may indicate that user device 222 is banned from operating on operator network 202 and/or banned from being used to settle transactions with POS terminals 220. If a user device 222 has been reported stolen, operator network 202 may update the information stored by EIR 214 to indicate an invalid status for the user device 222.

In some implementations, EIR 214 may store information indicating a status of each user device 222 registered with operator network 202. Additionally, or alternatively, EIR 214 may store information indicating a status of user devices 222 not registered with operator network 202. For example, different operator networks 202 may share information about the status of user devices 222 registered in respective operator networks 202. EIR 214 may store a list of user device IDs that are banned from operating on operator network 202. Additionally, or alternatively, EIR 214 may store a data structure with entries associating a user device ID and a status for user device 222 identified by the user device ID.

The equipment check request may include the user device ID and request that EIR 214 determine a status of user device 222 based on the information stored by EIR 214. EIR 214 may receive the equipment check request from HSS/AAA server 212.

As further shown in FIG. 4, process 400 may include sending an equipment check answer to HSS/AAA server 212 (block 410). For example, EIR 214 may send the equipment check answer.

EIR 214 may determine the status of the user device ID based on the information stored by EIR 214. For example, EIR 214 may determine a valid status if the user device ID is associated with a valid status in the data structure and/or if the user device ID is not included in the list of banned user device IDs. On the other hand, EIR 214 may determine an invalid status if the user device ID is associated with an invalid status in the data structure and/or if the user device ID is included in the list of banned user device IDs. The equipment check answer may include information identifying the status of the user device 222 identified by the user device ID.

HSS/AAA server 212 may receive the equipment check answer, indicating the status of user device 222, from EIR 214.

As further shown in FIG. 4, process 400 may include sending an authentication response to ePDG 218 (block 412). For example, HSS/AAA server 212 may generate and send an authentication response to ePDG 218 indicating the status of user device 222. In some implementations, the authentication response may be included in a Diameter EAP answer sent from HSS/AAA server 212 to ePDG 218.

ePDG 218 may receive the authentication response, indicating the status of user device 222, from HSS/AAA server 212.

In some implementations, if the authentication response indicates an invalid status, HSS/AAA server 212 may cause operator network 202 to notify a law enforcement agency (e.g., the police) that a user is attempting to use user device 222 (e.g., a stolen device). For example, operator network 202 may use PGW 210 to send a notification to the authorities. As will be described in more detail with respect to block 420, operator network 202 may perform various forms of security processing based on the authentication response indicating an invalid status.

As further shown in FIG. 4, process 400 may include sending the authentication response to POS terminal 220 (block 414). For example, ePDG 218 may send the authentication response to POS terminal 220 via network 226. In some implementations, the authentication response may be included in an IKEv2 authentication response.

POS terminal 220 may receive the authentication response, indicating the status of user device 222, from ePDG 218.

As further shown in FIG. 4, process 400 may include determining whether the status of user device 222 is a valid status (block 416). For example, POS terminal 220 may determine the status of user device 222 based on the status indicated by the authentication response. POS terminal 220 may determine the status of user device 222 to be a valid status when the authentication response indicates a valid status. Similarly, POS terminal 220 may determine the status of user device 222 to be an invalid status when the authentication response indicates an invalid status.

As further shown in FIG. 4, if the status of the user device is determined to be a valid status (block 416—yes), process 400 may include settling the transaction based on the payment information (block 418). For example, POS terminal 220 may settle the transaction with user device 222.

In some implementations, when settling the transaction, POS terminal 220 may establish a connection with payment server 224 (e.g., a credit card company server, a bank server, etc.) based on the payment information. POS terminal 220 may provide the payment information (e.g., a credit card number, a bank account number, etc.) and information indicating a settlement amount (e.g., an amount of money) to payment server 224. Payment server 224 may receive the payment information and the information indicating the settlement amount. Payment server 224 may provide payment for the transaction to POS terminal 220 based on the settlement amount.

Additionally, or alternatively, when settling the transaction, POS terminal 220 may receive payment directly from user device 222. For example, the payment information may include a virtual currency and user device 222 may store a virtual wallet in a memory included in or available to user device 222. User device 222 may deduct virtual currency from the virtual wallet and transfer the deducted virtual currency to POS terminal 220. POS terminal 220 may receive the virtual currency from user device 222 to settle the transaction.

As further shown in process 400, if the status of the user device is not determined to be a valid status (block 416—no), process 400 may include performing security processing (block 420). For example, POS terminal 220 may perform the security processing. Additionally, or alternatively, operator network 202 may perform the security processing.

In some implementations, when performing the security processing, POS terminal 220 may prevent settlement of the transaction. For example, POS terminal 220 may not accept a virtual currency from user device 222 and/or may not establish a connection with payment server 224 to settle the transaction.

In some implementations, when performing the security processing, POS terminal 220 may notify payment server 224 of an unauthorized attempt to use the payment information. The notification may indicate a location of POS terminal 220, a time the attempted transaction took place, a store associated with POS terminal 220, or the like. Payment server 224 may receive the notification and lock an account (e.g., a credit card account, a bank account, etc.) based on the notification. Additionally, or alternatively, payment server 224 may notify a user associated with the account about the unauthorized attempt to use the payment information via user device 222.

In some implementations, when performing the security processing, POS terminal 220 may notify operator network 202 (e.g., via ePDG 218) of an unauthorized attempt to use the payment information. The notification may indicate a location of POS terminal 220, a time the attempted transaction took place, a store associated with POS terminal 220, or the like. Operator network 202 may receive the notification and notify a user associated with user device 222 about the unauthorized attempt to use the payment information via user device 222. In some implementations, operator network 202 may send a request for the notification with the authentication response at block 414. POS terminal 220 may send the notification to operator network 202 based on the request.

In some implementations, when performing security processing, POS terminal 220 may cause security cameras, at a store where POS terminal 220 is located, to record an area including POS terminal 220. Accordingly, the security cameras may record the user (e.g., a person that stole user device 222) that is attempting to use user device 222 to settle the transaction. A proprietor of the store may send the recorded images to a law enforcement agency (e.g., the police). Additionally, or alternatively, POS terminal 220 may send a notification to security personnel in the store to detain the user of user device 222.

In some implementations, when performing security processing, POS terminal 220 may generate a command for user device 222 to execute. Additionally, or alternatively, operator network 202 may generate the command and send the command to POS terminal 220 at block 414. POS terminal 220 may send the command to user device 222. In some implementations, operator network 202 may send the command directly to user device 222 via an air interface (e.g., via base station 204). User device 222 may receive the command from POS terminal 220 and/or operator network 202 and execute the command.

The command may cause user device 222 to capture an image of the user of user device 222. For example, the command may cause user device 222 to display a prompt that causes the user to look at user device 222. The prompt may be any prompt that causes the user to look at user device 222, so that an image of the user's face may be captured by a camera included in user device 222. The prompt may mislead or fool the user into looking at user device 222 so as not to alert the user that the transaction is not being processed due to user device 222 having an invalid status. For instance, user device 222 may display "Press 'accept' to complete transaction." Such a prompt may cause the user to look at user device 222 without being alerted that anything is out of the ordinary, even though pressing "accept" will not actually complete the transaction. The camera included in user device 222 may capture an image of the user and send the image of the user to operator network 202 via the air interface (e.g., via base station 204) and/or send the image to POS terminal 220. Operator network 202 and/or POS terminal 220 may send the image of the user to the authorities and/or an owner of user device 222.

Additionally, or alternatively, the command may cause user device 222 to detect a fingerprint of a user of user device 222. For example, the command may cause user device 222 to display a prompt that causes the user to touch a touchscreen and/or fingerprint scanner included in user device 222. The prompt may be any prompt that causes the user to touch user device 222, so that a fingerprint of the user may be detected. The prompt may mislead or fool the user into touching user device 222 so as not to alert the user that the transaction is not being processed due to user device 222 having an invalid status. For instance, user device 222 may display "Press 'accept' to complete transaction." Such a prompt may cause the user to touch an "Accept" button displayed on the screen without being alerted that anything is out of the ordinary, even though pressing "accept" will not actually complete the transaction. The touchscreen and/or fingerprint scanner may detect the fingerprint and send fingerprint information identifying the fingerprint to operator network 202 via the air interface (e.g., via base station 204) and/or send the fingerprint information to POS terminal 220. Operator network 202 and/or POS terminal 220 may send the fingerprint information to authorities and/or an owner of user device 222.

Additionally, or alternatively, the command may cause user device 222 to prompt the user to present user identification (e.g., a driver's license) to a store clerk to allegedly complete the transaction. The user may provide the user identification to the store clerk and the store clerk may enter user information from the user identification (e.g., a name, an address, an ID number, etc.) into POS terminal 220 or another device. POS terminal 220 or the other device may send the user information to authorities, the owner of user device 222, and/or operator network 202. Additionally, or alternatively, POS terminal 220 may prompt the store clerk to request the user present the user identification.

Additionally, or alternatively, the command may cause user device 222 to lock and become unusable. In some implementations, the command may cause user device 222 to lock a virtual wallet stored by user device 222 so that virtual currency cannot be added or removed from the virtual wallet. Additionally, or alternatively, the command may cause user device 222 to transfer all the virtual currency stored in the virtual wallet to POS terminal 220 and/or operator network 202 so that the virtual currency can be returned to the owner of user device 222. Furthermore, the command may cause user device 222 to activate a GPS device and/or a tracking application included in user device 222 so that user device 222 may be tracked.

In some implementations, the user of user device 222 (e.g., a person that stole user device 222) may deactivate a wireless connection with operator network 202 (e.g., the air interface using base station 204). For example, the user may place user device 222 into an airplane mode or other mode that suspends user device 222's communication functions with operator network 202. Accordingly, operator network 202 may not be able to send commands to user device 222 (e.g., a command to lock user device 222, a command to lock a virtual wallet, a command to activate a GPS device, etc.) to user device 222 when user device 222 is reported stolen. However, the user connecting user device 222 to POS terminal 220 to settle a transaction, and POS terminal 220 connecting to operator network 202, may allow operator network 202 to send these commands to user device 222 via POS terminal 220. In some implementations, operator network 202 may attempt to send the command to user device 222 using the air interface (e.g., via base station 204), and if the attempt fails (e.g., the command is not received by user device 222) then operator network 202 may send the command to user device 222 via POS terminal 220.

Although FIG. 4 shows process 400 as settling a retail transaction between user device 222 and POS terminal 220, process 400 may also be used for other kinds of transactions between user device 222 and POS terminal 220. For example, POS terminal 220 may be an ATM and the user may use user device 222 to request money or financial information from the ATM. Process 400 may be executed to selectively permit such transactions and/or selectively execute security processing for such transactions.

Moreover, while FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
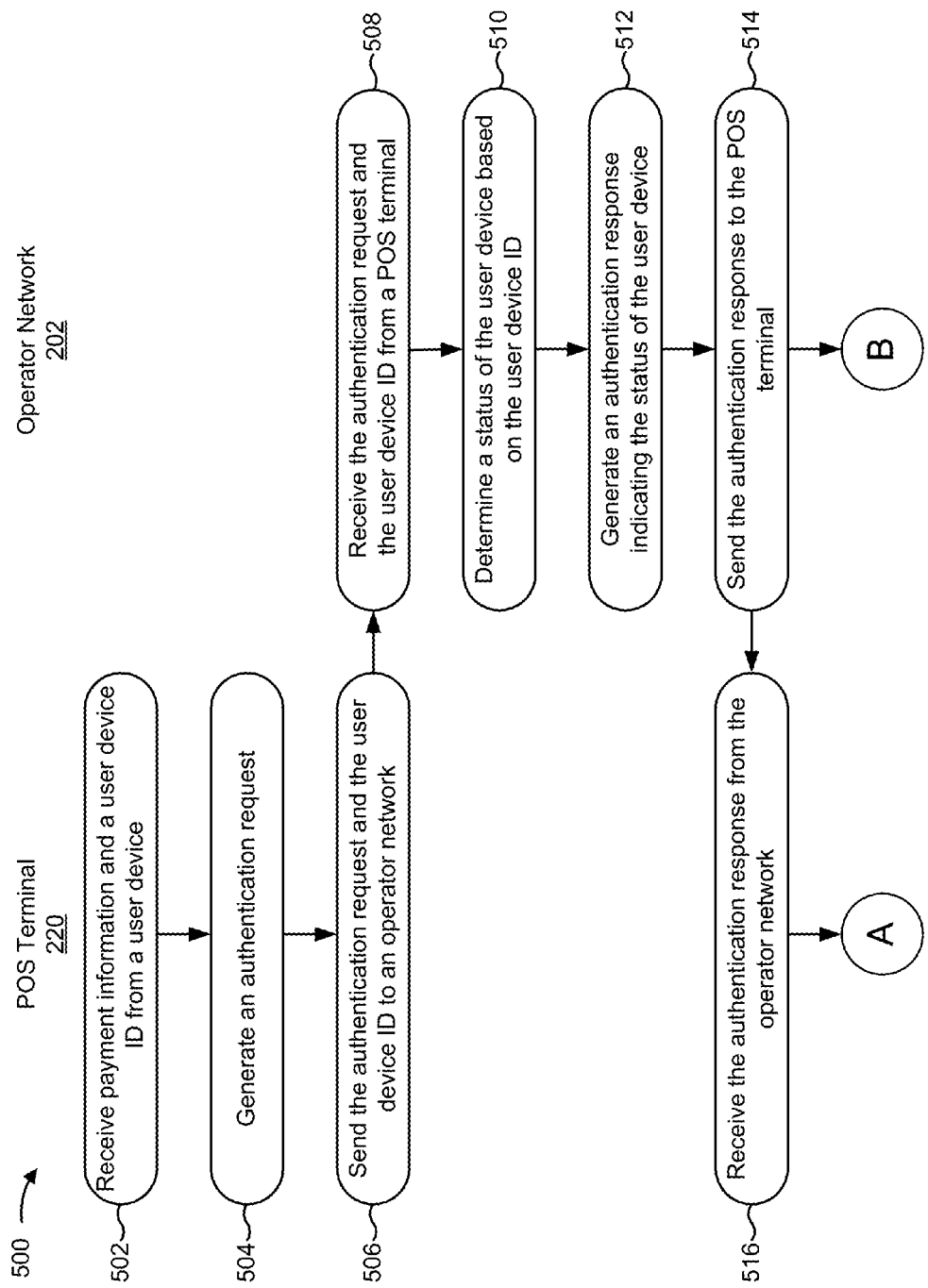
FIGS. 5A and 5B are flowcharts of an example process relating to the call flow diagram shown in FIG. 4.
Figure 5B:
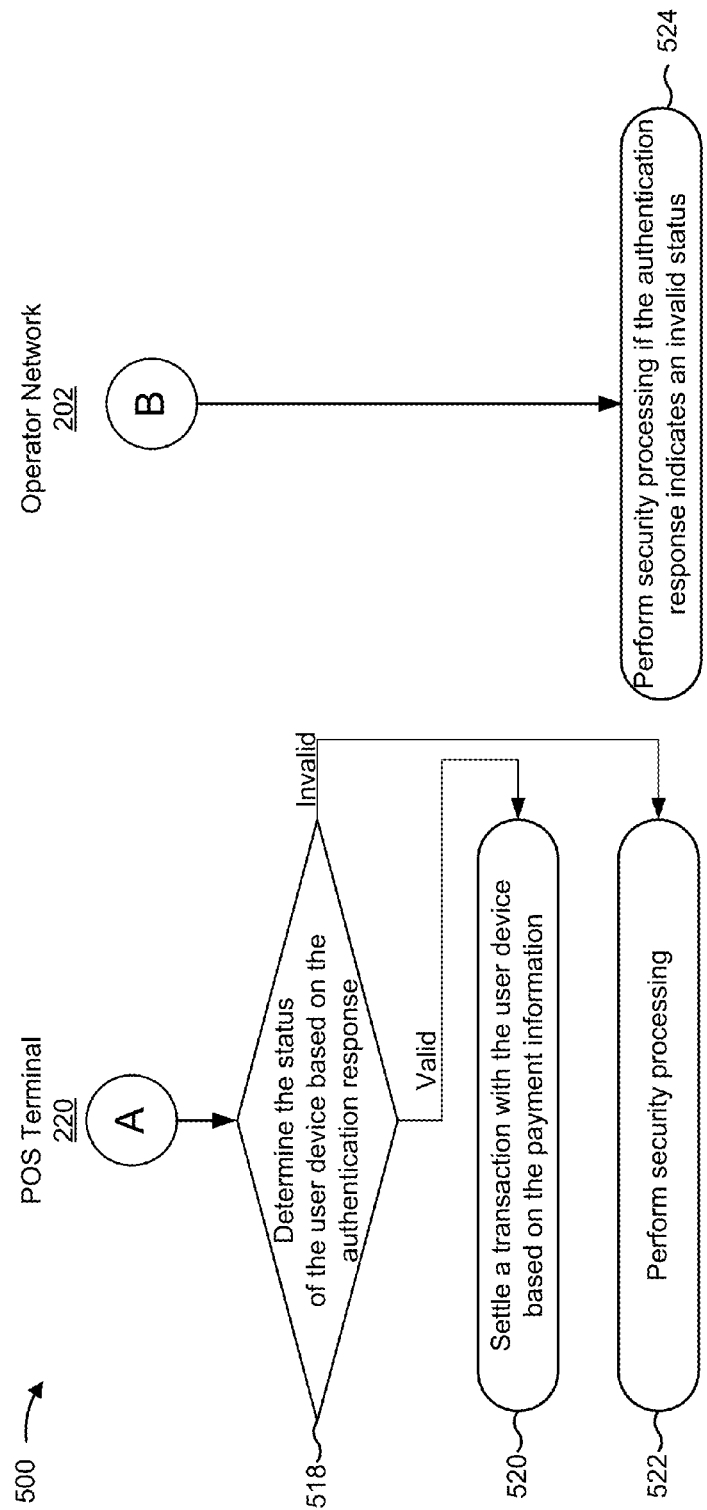

FIGS. 5A and 5B are flowcharts of an example process 500 relating to the call flow diagram shown in FIG. 4. In some implementations, one or more process blocks of FIGS. 5A and 5B may be performed by POS terminal 220 and/or operator network 202. In some implementations, one or more process blocks of FIG. 4 may be performed by another device or a group of devices separate from or including POS terminal 220 and/or operator network 202, such as user device 222, and/or payment server 224.

As shown in FIG. 5A, process 500 may include receiving payment information and a user device ID from user device 222 (block 502). For example, POS terminal 220 may receive the payment information, the user device ID, and/or the operator network information as described with respect to block 402 in FIG. 4.

As further shown in FIG. 5A, process 500 may include generating an authentication request (block 504). For example, POS terminal 220 may generate the authentication request as described with respect to block 404 in FIG. 4.

As further shown in FIG. 5A, process 500 may include sending the authentication request and the user device ID to operator network 202 (block 506). For example, POS terminal 220 may send the authentication request and the user device ID to operator network 202 as described with respect to block 404 in FIG. 4.

As further shown in FIG. 5A, process 500 may include receiving the authentication request and the user device ID from the POS terminal (block 508). For example, one or more devices of operator network 202 may receive the authentication request and the user device ID as described with respect to block 404 in FIG. 4.

As further shown in FIG. 5A, process 500 may include determining a status of user device 222 (block 510). For example, one or more devices of operator network 202 may determine the status of user device 222 as described with respect to blocks 406-410 in FIG. 4.

As further shown in FIG. 5A, process 500 may include generating an authentication response indicating the status of user device 222 (block 512). For example, one or more devices of operator network 202 may generate an authentication response indicating the status of user device 222 as described with respect to block 412 in FIG. 4.

As further shown in FIG. 5A, process 500 may include sending the authentication response to POS terminal 220 (block 514). For example, one or more devices of operator network 202 may send the authentication response to POS terminal 220 as described with respect to block 414 in FIG. 4.

As further shown in FIG. 5A, process 500 may include receiving the authentication response from operator network 202 (block 516). For example, POS terminal 220 may receive the authentication response from operator network 202 as described with respect to block 414 in FIG. 4.

As shown in FIG. 5B, process 500 may include determining the status of user device 222 based on the authentication response (block 518). For example, POS terminal 220 may determine the status of user device 222 based on the authentication response as described with respect to block 416 in FIG. 4.

As further shown in FIG. 5B, if the status of the user device is determined to be a valid status (block 518—valid), process 500 may include settling a transaction with user device 222 based on the payment information (block 520). For example, POS terminal 220 may settle the transaction based on the payment information as described with respect to block 418 in FIG. 4.

As further shown in FIG. 5B, if the status of the user device is determined to be an invalid status (block 518—invalid), process 500 may include performing security processing (block 522). For example, POS terminal 220 may perform security processing as described with respect to block 420 in FIG. 4.

As further shown in FIG. 5B, process 500 may include performing security processing if the authentication response indicates an invalid status (block 524). For example, operator network 202 may perform security processing as described with respect to blocks 412 and 420 in FIG. 4.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 400 may be performed in parallel.

Figure 6:
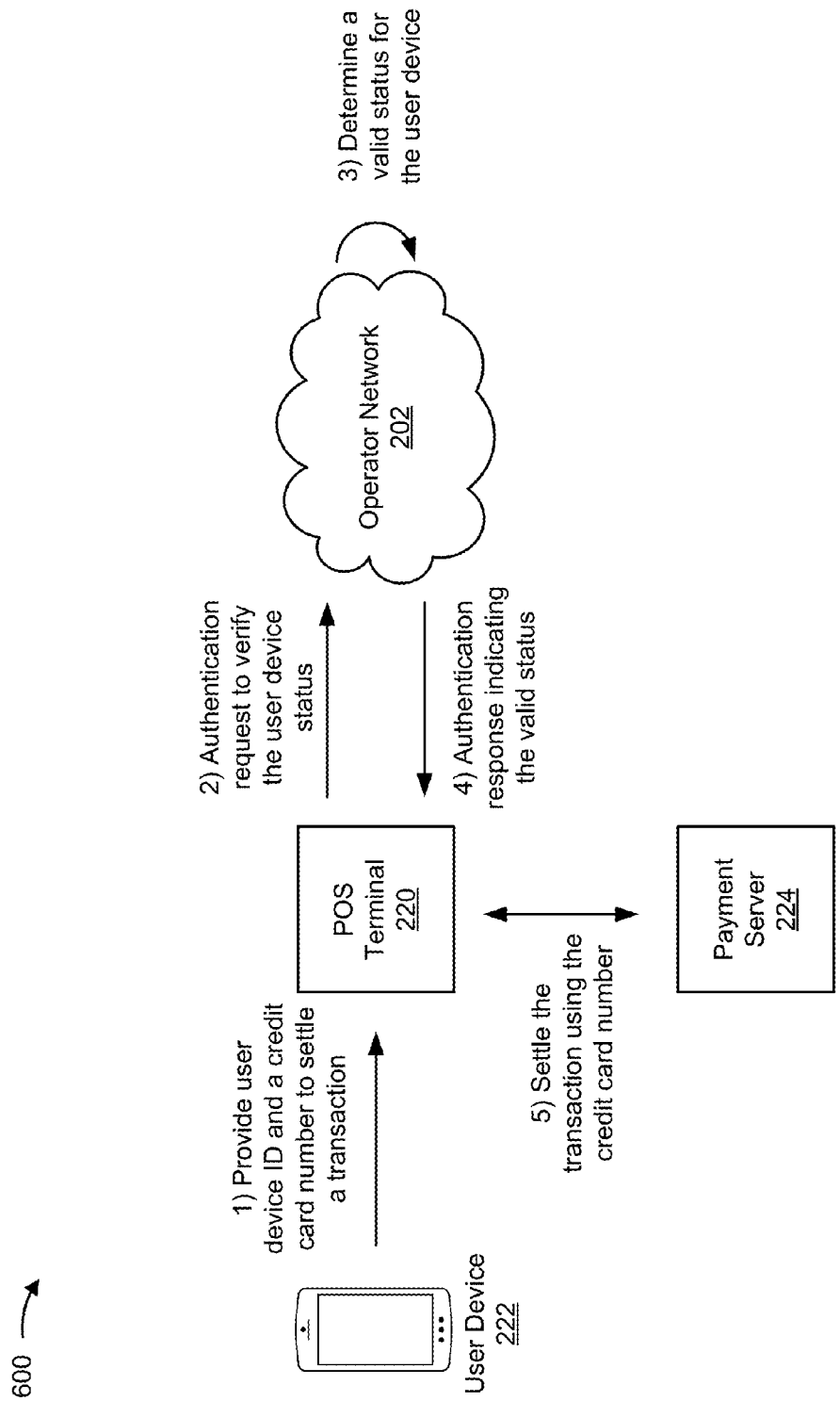
FIG. 6 is a diagram of an example implementation relating to the example processes shown in FIGS. 4, 5A, and 5B.

FIG. 6 is a diagram of an example implementation 600 relating to example processes 400 and 500 shown in FIGS. 4, 5A, and 5B. FIG. 6 shows an example of authenticating a POS transaction. More specifically, FIG. 6 shows an example of settling a transaction between user device 222 and POS terminal 220 based on user device 222 not being a stolen device.

In example implementation 600, assume user device 222 has not been reported stolen and EIR 214 stores information from which a determination can be made that user device 222 has a valid status. Further, assume a user is attempting to use user device 222 to settle a retail transaction with POS terminal 220. As shown in FIG. 6, user device 222 may send a credit card number (e.g., payment information) for settling the transaction and a user device identifier (ID) that identifies user device 222 to POS terminal 220 using NFC.

POS terminal 220 may receive the credit card number and the user device ID. POS terminal 220 may generate an authentication request to verify the user device status. The authentication request may indicate the user device ID. POS terminal 220 may send the authentication request to operator network 202 via ePDG 218.

Operator network 202 may receive the authentication request. Operator network 202 may search EIR 214 using the user device ID. Operator network 202 may determine that EIR 214 indicates user device 222 has a valid status and has not been reported stolen. Operator network 202 may generate an authentication response indicating user device 222 has a valid status and send the authentication response to POS terminal 220.

POS terminal 220 may receive the authentication response and determine user device 222 has a valid status based on the authentication response indicating the valid status. POS terminal 220 may use the credit card number to settle the transaction based on the valid status. For example, POS terminal 220 may establish a connection with payment server 224 and use the credit card number to settle the transaction with payment server 224.

Accordingly, a status of a user device 222 may be verified with operator network 202 before settling the transaction using the credit card number.

As indicated above, FIG. 6 is provided merely as an example. Other examples are possible and may differ from what was described with regard to FIG. 6.

Figure 7A:
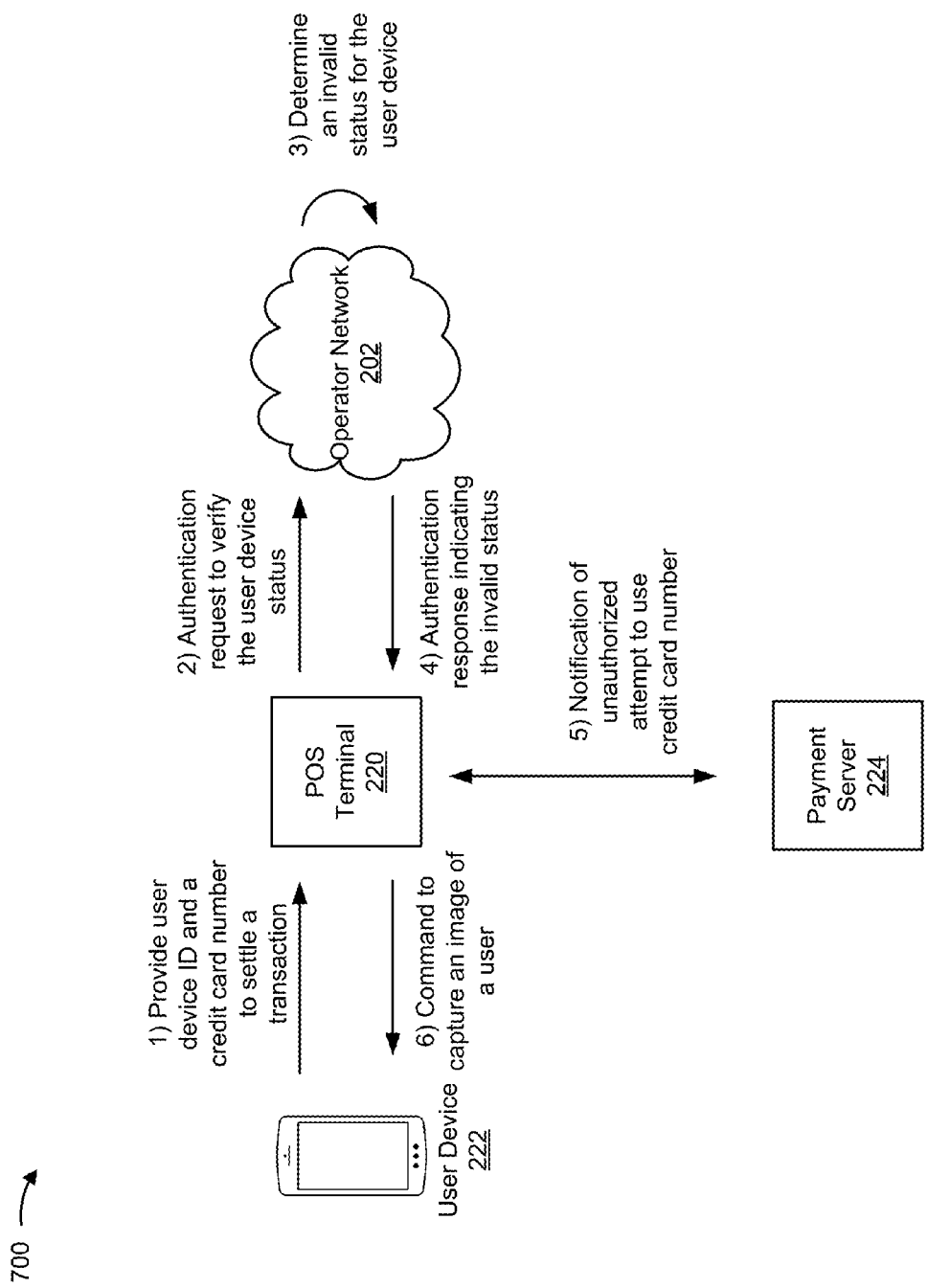
FIGS. 7A and 7B are diagrams of an example implementation relating to the example processes shown in FIGS. 4, 5A, and 5B.
Figure 7B:
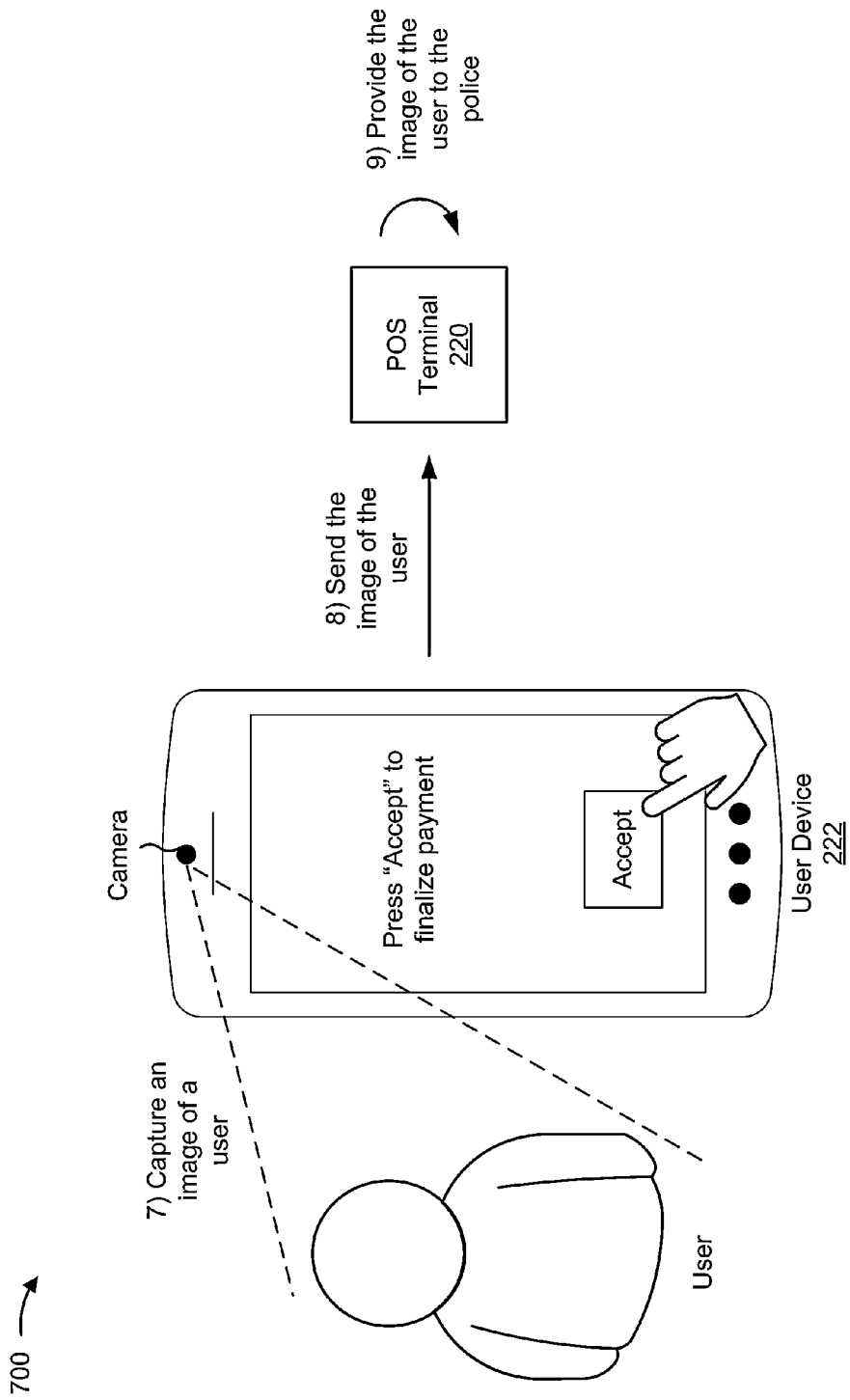

FIGS. 7A and 7B are diagrams of an example implementation 700 relating to example processes 400 and 500 shown in FIGS. 4, 5A, and 5B. FIGS. 7A and 7B show an example of authenticating a POS transaction. More specifically, FIGS. 7A and 7B shows an example of preventing a transaction between user device 222 and POS terminal 220 based on user device 222 being a stolen device.

In example implementation 700, assume user device 222 has been reported stolen and EIR 214 stores information indicating that user device 222 has an invalid status. Further, assume a user (e.g., a thief) is attempting to use user device 222 to settle a retail transaction with POS terminal 220. As shown in FIG. 7A, user device 222 may send a credit card number (e.g., payment information) for settling the transaction and a user device identifier (ID) that identifies user device 222 to POS terminal 220 using NFC.

POS terminal 220 may receive the credit card number and the user device ID. POS terminal 220 may generate an authentication request to verify the user device status. The authentication request may indicate the user device ID. POS terminal 220 may send the authentication request to operator network 202 via ePDG 218.

Operator network 202 may receive the authentication request. Operator network 202 may search EIR 214 using the user device ID. Operator network 202 may determine that EIR 214 indicates user device 222 has an invalid status and has been reported stolen. Operator network 202 may generate an authentication response indicating that user device 222 has an invalid status and send the authentication response to POS terminal 220. In some implementations, operator network 202 may notify a law enforcement agency (e.g., the police), via a connection with PGW 210, that user device 222 is currently being used at the POS terminal 220.

POS terminal 220 may receive the authentication response and determine user device 222 has an invalid status based on the authentication response indicating the invalid status. POS terminal 220 may prevent the transaction from being settled using the credit card number based on the invalid status of user device 222. Instead, POS terminal 220 may notify payment server 224 (e.g., operated by a credit card company) that an unauthorized attempt to use the credit card number was made. Accordingly, payment server 224 may flag the credit card number as being stolen or compromised and take appropriate action (e.g., prevent use of the credit card number in the future).

Furthermore, POS terminal 220 may generate a command to cause user device 222 to capture an image of the user of user device 222. Additionally, or alternatively, operator network 202 may generate the command and send the command to POS terminal 220. POS terminal 220 may send the command to user device 222 and user device 222 may receive the command.

A shown in FIG. 7B, user device 222 may execute the command and display an interface prompting the user to "Press 'Accept' to finalize payment" based on executing the command. However, the interface is merely displayed to cause the user to look at user device 222 and pressing "Accept" will not finalize the payment. User device 222 may use an included camera to capture an image (e.g., an image of the user) based on the user pressing the "Accept" button displayed on user device 222. User device 222 may send the image of the user to POS terminal 220 and/or operator network 202. POS terminal 220 and/or operator network 202 may receive the image of the user and send the image to the police to help apprehend the user (e.g., the thief).

Accordingly, a transaction between a stolen user device 222 and POS terminal 220 may be prevented even if the credit card number has not been reported as stolen.

As indicated above, FIGS. 7A and 7B are provided merely as an example. Other examples are possible and may differ from what was described with regard to FIGS. 7A and 7B.

Implementations described herein may verify a status of a user device, used to settle a transaction at a POS terminal, with an operator network before settling the transaction with the POS terminal. Accordingly, transactions between POS terminals and stolen user devices may be prevented even though payment information stored on the stolen user devices may not have been flagged as stolen. Moreover, implementations described herein may provide security measures to prevent future use of the stolen user device based on an attempt to use the stolen user device at a POS terminal.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
  receive a request, from a point of sale terminal, to verify a status of a user device being used to settle a transaction with the point of sale terminal,
    the status of the user device indicating whether the user device has been reported stolen to an operator network;
  receive a user device identifier, from the point of sale terminal, that identifies the user device, the point of sale terminal receiving the user device identifier from the user device;
  determine, based on receiving the request and the user device identifier from the point of sale terminal, the status of the user device;
  generate a response indicating the status of the user device;
  send the response, indicating the status of the user device, to the point of sale terminal to permit the point of sale terminal to selectively settle the transaction; and
  execute security processing based on the status of the user device indicating an invalid status, the security processing including:
    generating a command to send to the user device to cause the user device to:
      display a prompt that causes a user to look at the user device, the prompt requesting the user to finalize payment,
      receive a response to the prompt by the user,
      cause a camera of the user device to capture a first image of the user based on the response to the prompt by the user, and
      cause the user device to lock,
    causing a security camera, at a same location as the point of sale terminal, to capture a second image of at least one of:
      an area including the point of sale terminal, or
      an area within a building in which the point of sale terminal is located, and
    receiving the first image and the second image.

2. The device of claim 1, where the one or more processors, when receiving the request, are to:
  receive the request, from the point of sale terminal, via a secure tunnel with an evolved packet data gateway associated with the operator network.

3. The device of claim 1, where the one or more processors, when determining the status of the user device, are to:
  determine the status of the user device based on an equipment information register, the equipment information register storing information identifying user device identifiers associated with stolen user devices.

4. The device of claim 1, where the operator network includes at least one of:
  an evolved packet data gateway;
  a home subscriber server; or
  an authentication, authorization, accounting server.

5. The device of claim 1, where the one or more processors, when determining the status of the user device, are to:
  determine that the status of the user device indicates that the user device has been reported stolen; and
  where the one or more processors are further to:
    send a notification to at least one of a law enforcement agency or an owner of the user device based on determining that the status of the user device indicates that the user device has been reported stolen.

6. The device of claim 1, where the command is a first command; and where the one or more processors are further to:

generate a second command for securing the user device based on the status of the user device indicating that the user device has been banned from use on the operator network or reported stolen, the second command to cause the user device to lock a virtual wallet stored by the user device; and send the second command to the user device to cause the user device to execute the second command.

7. A non-transitory computer-readable medium storing instructions, the instructions comprising:
one or more instructions that, when executed by one or more processors, cause the one or more processors to:
receive a request to verify a status of a user device being used to request money from a terminal or settle a transaction with the terminal, the status of the user device indicating whether the user device has been banned from use on an operator network;
receive a user device identifier, from the terminal, that identifies the user device, the terminal receiving the user device identifier from the user device;
determine, based on receiving the request and the user device identifier from the terminal, the status of the user device;
generate a response indicating the status of the user device;
send the response, indicating the status of the user device, to the terminal to permit the terminal to provide the money or settle the transaction; and
execute security processing based on the status of the user device indicating an invalid status, the security processing including:
generating a command to send to the user device to cause the user device to:
display a prompt that causes a user to look at the user device, the prompt requesting the user to finalize payment,
receive a response to the prompt by the user,
cause a camera of the user device to capture an image of the user based on the response to the prompt by the user, and
cause the user device to lock, and
receiving the image from the user device.

8. The non-transitory computer-readable medium of claim 7, where the command is a first command; and
where the one or more instructions, when executed by the one or more processors, further cause the one or more processors to:
determine that the status of the user device indicates the user device is banned from use on the operator network or reported stolen;
generate a second command for securing the user device based on the status of the user device indicating that the user device has been banned from use on the operator network or reported stolen; and
send the second command to the user device to cause the user device to execute the second command.

9. The non-transitory computer readable medium of claim 8, where the second command causes the user device to lock a virtual wallet stored by the user device.

10. The non-transitory computer readable medium of claim 8, where the second command causes the user device to at least one of:
activate a global positioning system (GPS) device included in the user device, or
activate a tracking application that tracks a location of the user device.

11. The non-transitory computer readable medium of claim 8, where the second command causes the user device to transmit a virtual currency stored by the user device; and
where the one or more instructions, when executed by the one or more processors, further cause the one or more processors to:
receive the virtual currency transmitted by the user device; and
provide the virtual currency to an owner of the user device.

12. The non-transitory computer-readable medium of claim 7, where the one or more instructions, when executed by the one or more processors, further cause the one or more processors to:
send the command to the user device via the terminal.

13. The non-transitory computer-readable medium of claim 7, where the one or more instructions, when executed by the one or more processors, further cause the one or more processors to:
send the command to the user device via an air interface using a base station; and
resend the command to the user device via the terminal based on the command not being received by the user device via the air interface.

14. A method, comprising:
receiving, by a point of sale terminal, payment information from a user device to settle a transaction;
receiving, by the point of sale terminal, a user device identifier from the user device;
generating, by the point of sale terminal and based on receiving the payment information and the user device identifier, a request to verify a status of the user device with an operator network, the status indicating whether the user device has been reported stolen, and the request including the user device identifier;
sending, by the point of sale terminal and based on generating the request, the request to the operator network;
receiving, by the point of sale terminal, a first response to the request from the operator network, the first response indicating the status of the user device; and
executing, by the point of sale terminal, security processing based on the status of the user device indicating an invalid status, the security processing including:
generating a command to send to the user device to cause the user device to:
display a prompt that causes a user to look at the user device, the prompt requesting the user to finalize payment,
receive a second response to the prompt by the user,
cause a camera of the user device to capture a first image of the user based on the second response to the prompt by the user, and
cause the user device to lock,
causing a security camera, at a same location as the point of sale terminal, to capture a second image of at least one of:
an area including the point of sale terminal, or
an area within a building in which the point of sale terminal is located, and
receiving the first image and the second image.

15. The method of claim 14, where the first response indicates that the user device has been reported stolen, and where the method further comprises:
preventing settlement of the transaction using the payment information based on the first response indicating that the user device has been reported stolen.

16. The method of claim 14,
where the prompt includes a request for the user to touch a touchscreen or fingerprint scanner of the user device.

17. The method of claim 14,
where the method further comprises:
notifying a financial institution, associated with the payment information, of an unauthorized attempt to use the payment information.

18. The method of claim 14, where the first response indicates that the user device has been reported stolen and where the method further comprises:
instructing, based on the first response indicating that the user device has been reported stolen, the user device to send at least one of the first image or the second image to at least one of:
the operator network,
an owner of the user device, or
a law enforcement agency.

19. The method of claim 14, where the first response indicates that the user device has been reported stolen, and where the method further comprises:
prompting an operator of the point of sale terminal to request identification from the user based on the first response indicating that the user device has been reported stolen;
receiving user information identifying the user from the operator; and
sending the user information to at least one of:
the operator network,
the point of sale terminal,
an owner of the user device, or
a law enforcement agency.

20. The method of claim 14, where sending the request to the operator network includes:
sending the request to the operator network via a secure channel with an evolved packet data gateway.

* * * * *